US008434871B2

(12) United States Patent
Bartol et al.

(10) Patent No.: US 8,434,871 B2
(45) Date of Patent: May 7, 2013

(54) PROJECTION SCREENS FOR THREE DIMENSIONAL IMAGES

(75) Inventors: Thomas M. Bartol, Carlsbad, CA (US); Paul O. Dunn, Jr., El Cajon, CA (US); Terrence J. Sejnowski, Solana Beach, CA (US); Dejan Vucinic, San Diego, CA (US)

(73) Assignee: The Salk Institute for Biological Studies, La Jolla, CA (US)

( * ) Notice: Subject to any disclaimer, the term of this patent is extended or adjusted under 35 U.S.C. 154(b) by 258 days.

(21) Appl. No.: 12/811,670

(22) PCT Filed: Jan. 7, 2009

(86) PCT No.: PCT/US2009/030284
§ 371 (c)(1),
(2), (4) Date: Jul. 2, 2010

(87) PCT Pub. No.: WO2009/089256
PCT Pub. Date: Jul. 16, 2009

(65) Prior Publication Data
US 2010/0328613 A1 Dec. 30, 2010

Related U.S. Application Data

(60) Provisional application No. 61/019,544, filed on Jan. 7, 2008.

(51) Int. Cl.
*G02B 27/26* (2006.01)
*G03B 21/14* (2006.01)

(52) U.S. Cl.
USPC .................. 353/7; 353/79; 359/458; 359/459

(58) Field of Classification Search .................. 353/7, 8, 353/20; 359/458, 459
See application file for complete search history.

(56) References Cited

U.S. PATENT DOCUMENTS

| | | | | |
|---|---|---|---|---|
| RE29,091 E | * | 12/1976 | De Palma et al. | 359/454 |
| 5,993,004 A | * | 11/1999 | Moseley et al. | 353/8 |
| 6,600,600 B2 | * | 7/2003 | Chen | 359/459 |
| 7,453,637 B2 | * | 11/2008 | Taira et al. | 359/455 |
| 7,864,420 B2 | * | 1/2011 | Shinbo et al. | 359/459 |
| 7,898,734 B2 | * | 3/2011 | Coleman et al. | 359/449 |
| 8,169,699 B2 | * | 5/2012 | Petersen et al. | 359/452 |
| 8,169,700 B2 | * | 5/2012 | Katsuma et al. | 359/459 |
| 2005/0185419 A1 | | 8/2005 | Holman et al. | |
| 2006/0018025 A1 | | 1/2006 | Sharon et al. | |
| 2007/0195407 A1 | * | 8/2007 | Poulsen | 359/459 |
| 2010/0259818 A1 | * | 10/2010 | Mikoshiba | 359/459 |
| 2011/0069385 A1 | * | 3/2011 | Katsuma et al. | 359/459 |
| 2012/0081782 A1 | * | 4/2012 | Coleman et al. | 359/459 |

OTHER PUBLICATIONS

International Search Report and Written Opinion of the International Searching Authority, mailed Mar. 2, 2009, for corresponding International Application No. PCT/US2009/030284.

\* cited by examiner

*Primary Examiner* — William C Dowling
(74) *Attorney, Agent, or Firm* — Klarquist Sparkman, LLP

(57) ABSTRACT

Projection screens for projection of binocular stereoscopic images include a metallic projection surface that includes a plurality of depressions configured to produce left and right viewable light fluxes in response to received left and right modulated light fluxes. The metallic projection surface can be formed by beadblasting, and multiple panels can be secured together by welding or other process. Projection surfaces can also be formed by molding or otherwise forming a conductive surface on a dielectric or other substrate.

21 Claims, 3 Drawing Sheets

PROJECTION SCREENS FOR THREE DIMENSIONAL IMAGES

CROSS REFERENCE TO RELATED APPLICATIONS

This is the U.S. National Stage of International Application No. PCT/US2009/030284, filed Jan. 7, 2009, which was published in English under PCT Article 21(2), which in turn claims the benefit of U.S. Provisional Application No. 61/019,544, filed Jan. 7, 2008. The provisional application is incorporated herein in its entirety.

FIELD

The disclosure pertains to projection screens and projection systems for binocular stereo imagery.

BACKGROUND

Stereoscopic projection systems have been developed that are based on the presentation of different images to an observer's left and right eyes. Typically the different images are associated with different states of polarization of corresponding light fluxes, and the observer is provided with eyewear that contains polarizers oriented so that each eye receives only the appropriate light flux. For example, images for a left eye and a right eye can be presented in orthogonal, linear states of polarization, and eyewear provided with suitably configured linear polarizers.

Stereoscopic images can be provided for entertainment, industrial, or scientific purposes. Examples of such images include stereoscopic travel images, images for video or other games, and viewing of three dimensional models of chemical or biological systems that are under investigation. Frequently, such images are to be presented to groups of observers to provide a common viewing experience and the images are preferably projected onto a projection screen or other surface. Unfortunately, conventional projection screens and other surfaces are often unsuitable because an incident light flux is partially or completely depolarized by the projection screen so that the stereo viewing effect is severely degraded. While a few suitable stereo projection screens are commercially available, these screens are fragile and require special handling, set-up, and maintenance. In addition, very large screens tend to be difficult to manufacture, and are too expensive for many potential applications. Non-planar screens are even more problematic. In spite of the increasing interest in and the development of stereo imaging systems, durable projection screens for stereo imaging continue to be unavailable. Described below are several solutions to these long standing problems.

SUMMARY

Representative stereoscopic projection systems include at least one image projector configured to produce a first modulated light flux in a first state of polarization and a second modulated light flux in a second state of polarization, and project corresponding first and second images. A screen comprising a conductive surface is configured to receive the first image associated with the first modulated light flux and the second image associated with the second modulated light flux and produce a first viewable image and a second viewable image, respectively. The first and second viewable images generally correspond to scattering of the respective modulated light fluxes so that images are viewable over a predetermined viewing area. The first and second viewable images can be provided sequentially (for example, left and right images can alternate) or simultaneously. The screen is configured so that light fluxes associated with the first viewable image and the second viewable image are substantially orthogonally polarized. In some examples, the first state of polarization and the second state of polarization are substantially orthogonal. In other examples, the first state of polarization and the second state of polarization are substantially linear or are substantially circular. In some examples, the projection screen comprises a metallic sheet, and the projection surface is a surface of the metallic sheet. In typical examples, the projection surface includes a plurality of substantially randomly situated scattering depressions. In other examples, the projection screen includes a substrate to which the metallic sheet is secured.

Methods comprise providing at least one metallic sheet and beadblasting a surface of the at least one metallic sheet so as to provide a light scattering surface. The beadblasted surface of the at least one metallic sheet is positioned so as to receive polarization encoded first and second image light fluxes, and produce corresponding substantially orthogonally polarized stereoscopically viewable light fluxes. In additional examples, a plurality of metallic sheets is provided, and the sheets are joined so as to form a substantially continuous beadblasted surface. In some examples, the metallic sheets are substantially planar or substantially non-planar. In additional embodiments, the metallic sheets are joined by welding. In a representative example, the one or more metallic sheets are aluminum.

The foregoing and other features and advantages of the disclosed technology will become more apparent from the following detailed description, which proceeds with reference to the accompanying drawings.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" means optically or mechanically coupled or linked and does not exclude the presence of intermediate elements between the coupled items.

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Figure 1:
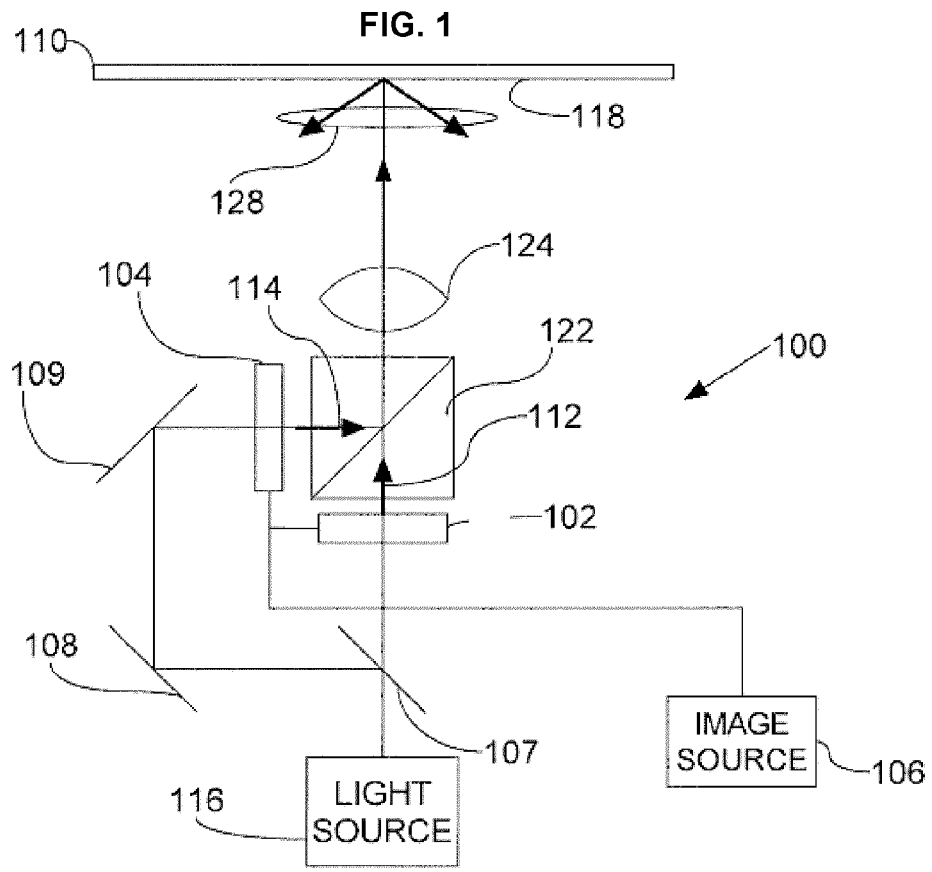
FIG. 1 is a schematic diagram of a projection system for stereo images.

FIG. 1 illustrates a representative binocular stereo projection system 100 that is coupled to an image source 106 such as, for example, a computer or workstation that is configured to provide stereo image pairs. A light source 116 and turning mirrors 107-109 provide unmodulated light fluxes to spatial light modulators 102, 104 that produce a left image light flux 112 and a right image light flux 114 that are directed to a projection screen 110 to form a left image and a right image, respectively. A polarizing beam splitter cube 122 can be used to combine the left image light flux and the right image light flux. The spatial light modulators 102, 104 can be based on, for example, one or more liquid crystal display panels and associated polarizers, micromirror arrays, or other apparatus for suitably modulating the image light fluxes 112, 114. A lens assembly 124 is situated so as to form a left image and a right image on a surface 118 of the projection screen 110. As shown in FIG. 1, in some examples, a single lens can be used to form both images. In other examples, two lens assemblies can be used, one for each modulated image light flux. In other examples, a single spatial light modulator is used to alternately produce the left and right image fluxes.

To observe stereoscopic images, an observer is provided with polarizing eyewear that includes a left polarizer and a right polarizer that are situated in a frame so as to be in front of the observer's left eye and right eye, respectively, in an as-worn position. The left and right polarizers are conveniently linear sheet polarizers with axes at 90 degrees with respect to each other, and at 45 degrees with respect to a vertical axis in an as-worn position. The left and right image light fluxes are substantially polarized in corresponding polarization states so that a left eye and a right eye receive substantially only the appropriate images. Typically, the surface 118 of the projection screen 120 scatters or otherwise directs the left and right image light fluxes so as to produce a viewable light flux 128 in a viewing area or over a viewing angle. The viewable light flux generally includes a left viewable light flux and a right viewable light flux that are substantially polarized in states of polarization corresponding to states of polarization of the left and right image light fluxes. While linear polarizers and linear states of polarization are convenient, other types of polarizers and polarization states can be used such as circular or elliptical polarizations that are arranged so that each eye receives substantially only the appropriate image. In some examples, the viewable light fluxes are substantially orthogonally polarized but have different states of polarization than the corresponding left and right image light fluxes. For acceptable image quality, no more than about 1%, 5%, or 10% of a light flux intended for a particular eye should reach the other eye.

The projection screen 110 is situated to receive the left and right light fluxes and at least partially diffuse the light fluxes so that images are viewable over a viewing area. The viewing area can be sized based on a selected number of viewers. In some cases, the viewing area size is controlled to provide security, or to provide brighter images than would be available if the projection screen scattered the light fluxes over a larger solid angle.

While mere selection of a particular scattering pattern or range of solid angles is sufficient to provide appropriate viewing for many types of images, for polarization-based stereoscopic images, the scattered light fluxes are substantially orthogonally polarized so that the left right flux and the right light flux are substantially received at the appropriate eye of an image viewer. Typically, the projection screen scatters the light fluxes so that the scattered light fluxes substantially retain their original states of polarization.

Figure 2:
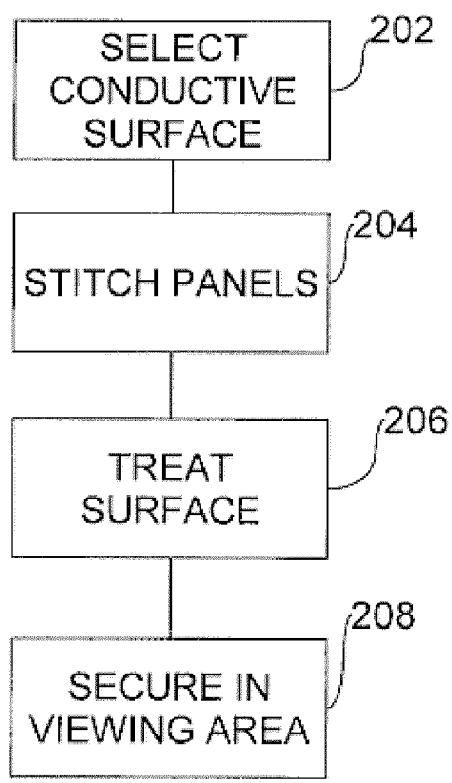
FIG. 2 is a block diagram illustrating a method making a projection screen for stereo images.

A representative method of manufacturing stereo projection screens is illustrated in FIG. 2. In a step 202, a conductive material for the screen surface is selected. Metals are convenient, particularly metals that appear neutrally colored so as not to add coloration to projected images. Such coloration can be compensated, if desired, so that metals having a colored appearance can be used, but a neutral appearing conductor generally permits simpler implementation and a higher total reflectivity. While projection screens can be based on a single substrate, in some examples multiple substrates are joined to increase screen area or to conform to a particular surface intended for projection. As shown in FIG. 2, in a step 204, two or more such substrates are stitched together to form a substrate having a larger projection surface area for larger projected images. In a step 206, a projection surface is treated to provide a random, quasi-random or ordered array of surface depressions or dimples. Preferably, such depressions are based on smooth curves, and only limited portions of surfaces of the depressions are substantially tilted with respect to a perpendicular to the projection surface that does not include such a depression. In a step 208, the assembled, treated surface is secured in a viewing area. In other installations, panels are secured in place prior to stitching together and surface treatment is applied to the installed stitched-together panels.

Figure 3:
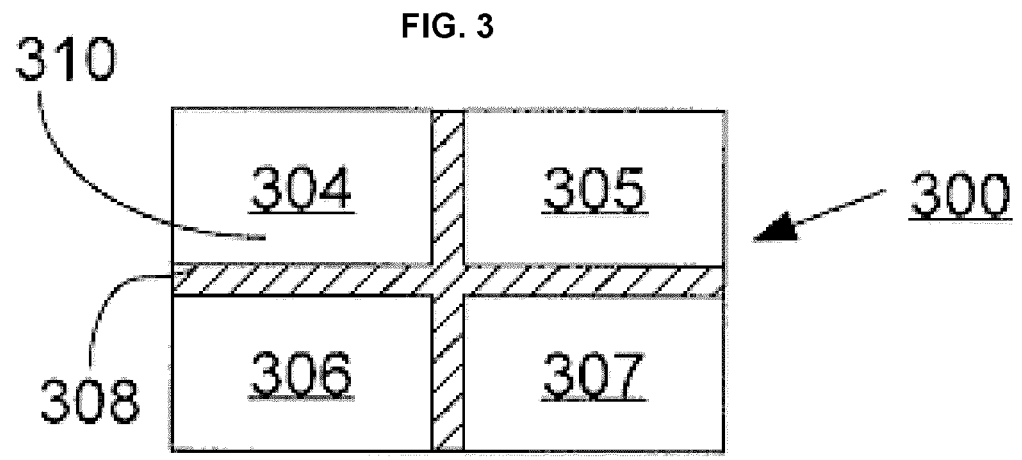
FIG. 3 is a view of a representative multi-panel projection screen.

Large projection screens and screens of various shapes can be readily provided by suitably processing a conductive surface. For example, referring to FIG. 3, a projection screen 300 includes a plurality of panels 304-307 that are secured to each other by, for example, a welded seam 308. The panels 304-307 can be conveniently secured to a screen support (for example, a projection room wall) prior to joining together to simplify shipment, delivery, and mounting of the screen 300. After the panels are situated and joined, a surface 310 of the screen 302 is processed by, for example, beadblasting. While the surface 310 may become damaged or worn due over time, the surface 310 can be simply restored by, for example, cleaning and polishing to remove dirt, grease, or other contaminants, and polishing or other surface treatment to fix or reduce any apparent mechanical damage. Light scattering areas can be reworked by beadblasting again, usually without having to uninstall the screen.

Figure 4:
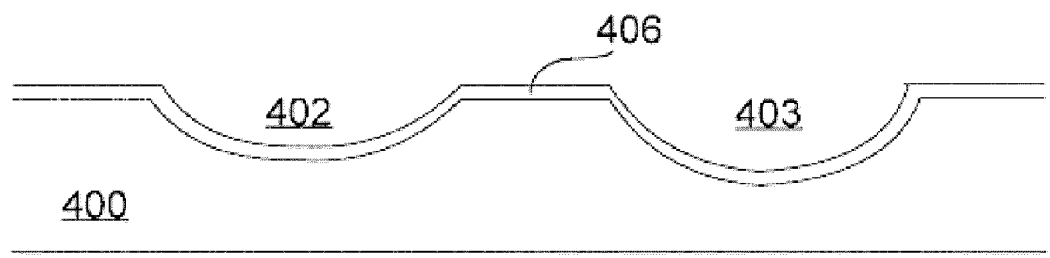
FIG. 4 is a sectional view of a projection screen that includes a conductive coating.

While stereoscopic projection screens can be conveniently provided based on metal sheets, suitable conductive surfaces can be provided in other ways as well. For example, referring to FIG. 4, a projection screen includes a screen substrate 400 that is provided with depressions 402, 403 and a conductive layer 406 is situated so as to conform to surfaces of the depressions 402, 403. The conductive layer 406 is generally sufficiently reflective so that an incident light flux is substantially reflected, and transmission through the conductive layer 406 is typically quite low. The conductive layer 406 can be formed of any conductor such as, for example, aluminum, iron, copper, steel, or other metals and can be provided by electroplating, lamination of a conductive sheet, evaporation, sputtering, or other process. The depressions 402, 403 can be formed by beadblasting a surface of the substrate 400. Suitable substrate materials include glasses, plastics, metals and other materials, and the conductive layer can be deposited on a deformed substrate by sputtering, atomic layer deposition, evaporation, electroplating, or other processes.

Figure 5:
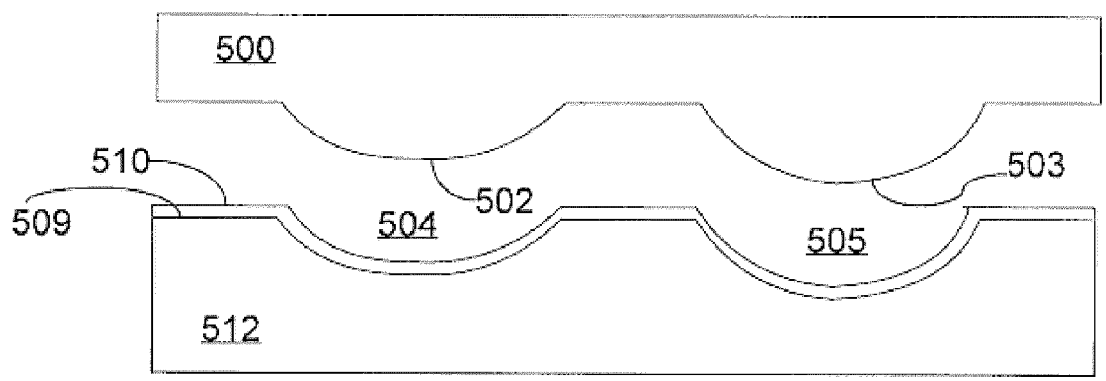
FIG. 5 is a sectional view of a projection screen and a mold for shaping a surface of the projection screen.

With reference to FIG. 5, a mold portion 500 includes first and second protrusions 502, 503 that can be used to form corresponding depressions 504, 505 in a screen substrate 512. The mold portion 500 can be used in an injection molding process or other molding process, or can be used in a casting process. In other examples, the mold portion 500 can be used in an embossing process so as to directly form depressions in a metallic sheet. A projection surface 509 can be provided as a surface of a conductive layer 510 that is situated on the screen substrate. The conductive layer can be secured to or formed on the screen substrate prior to or after forming the depressions 504, 505 as convenient. Alternatively, the conductive layer can be omitted and a conductive substrate used.

Dimples provided in a projection surface generally are of many different sizes and can be characterized as having an effective depth D and an effective radius R. Typical effective depths are between about 0.005 mm and 0.500 mm, and effective radii are between about 0.025 mm and 0.500 mm. In other examples, the dimples can have circular, oval, elliptical or other shapes at the surface of a projection substrate. In some examples, an effective semimajor axis and semiminor axis and an orientation angle of the semimajor and semiminor axes can be used to characterize a size distribution of the dimples. The dimples are conveniently formed by, beadblasting, molding, or other processes. In one example, such dimples are formed by beadblasting aluminum with glass beads (200 grit or other grit size) with typical particle diameters of between about 50 μm and 100 μm. Such processing tends to dimple a surface without removing material and screen surfaces can be reprocessed without substantial reductions in screen thickness or screen geometry. While other abrasive materials can be used, many such materials remove material from the surface and produce jagged, rough dimples associated with reduced binocular stereo image quality. Typically dimples in beadblasted surfaces have angles of less than about 30 degrees, 20 degrees, or 10 degrees with respect to an axis perpendicular to a substrate surface normal prior to beadblasting. Other screen surfaces have projections that are complementary to such surface dimples.

In additional examples, projection screens are based on substantially smooth protrusions that extend outward from a screen surface but that are otherwise geometrically similar to surface dimples or impressions described previously. Such protrusions general have circular, elliptical, or oval cross sectional areas at a screen surface from which they extend. Such protrusions can be formed by pressing a flexible conductive substrate against a corresponding die. The formed flexible substrate can then be secured to a support substrate. Alternatively, a substrate with corresponding protrusions can be coated with a conductive layer as noted above.

Figure 6A:
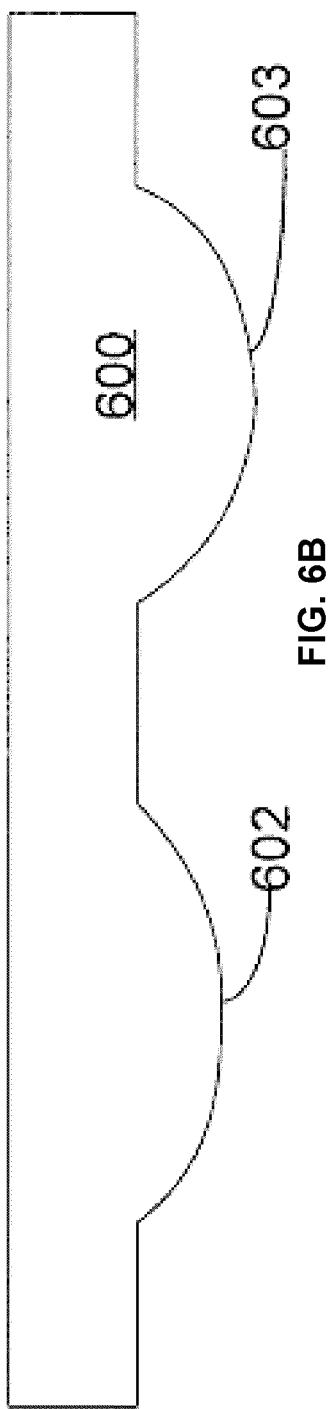
FIG. 6A is sectional view of a projection screen that includes a plurality of scattering bumps.
Figure 6B:
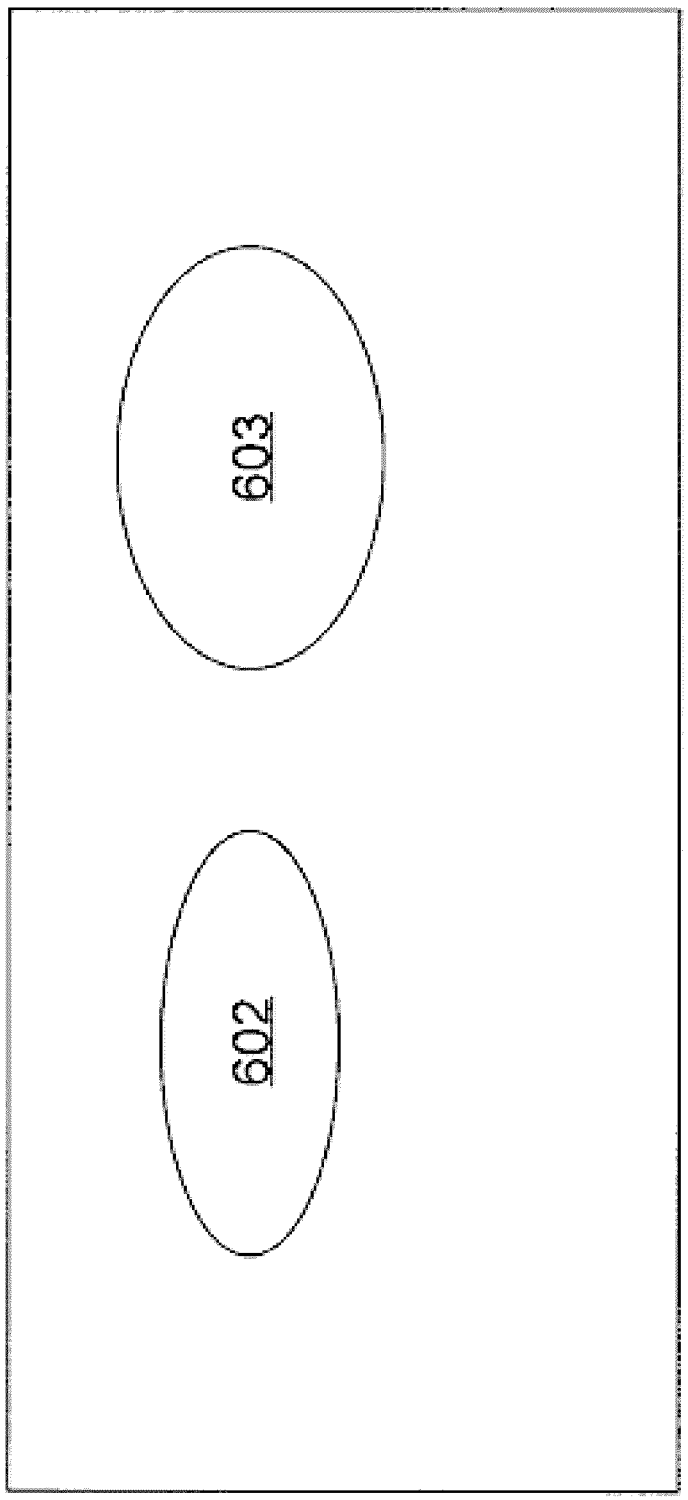
FIG. 6B is a plan view of the projection screen of FIG. 6A.

Referring to FIGS. 6A-6B, a projection screen includes scattering bumps 602, 603 formed in or situated on a screen substrate 600. Typically, the screen substrate 600 is conductive, but in some examples, a conductive layer is situated on the screen substrate so as to form the scattering bumps, and the substrate can be non-conductive. As shown in FIGS. 6A-6B, the scattering bumps 602, 603 have different elliptical cross-sections, and have semimajor axes that are approximately parallel. In other examples, bumps have circular or other cross sections of different sizes or a common size, and can be aligned or oriented randomly.

Superior results are typically obtained based on projection surfaces defined by applying a stream of relatively soft, round or smooth particles such as glass beads at pressures of up to 120 psi or higher. Such streams can be applied along a normal to a surface or at other angles, and are generally applied so as to produce a uniformly appearing surface. Surfaces that are conformal with such surfaces are can also be used, and direct beadblasting of the projection surface is unnecessary. Projection surfaces defined in this way tend to have a plurality of surface deformations that singly scatter incident light fluxes so as to limit any depolarization or change in state of polarization associated with scattering. Thus, relatively smooth deformations such as dimples or bumps are preferred, and sharp edges and deep dimples and tall bumps should be limited. Typical projection screen surfaces include a plurality of such substantially smooth scattering deformations.

In view of the many possible embodiments to which the principles of the disclosed technology may be applied, it should be recognized that the illustrated embodiments are only preferred examples and should not be taken as limiting the scope of the disclosure. Rather, the scope of the invention is defined by the following claims.

We claim:

1. A stereoscopic projection system, comprising:
    an image projector configured to produce a first modulated light flux in a first state of polarization and a second modulated light flux in a second state of polarization, and project corresponding first and second images; and
    a screen comprising a beadblasted conductive surface having a plurality of substantially smooth scattering deformations and situated to receive the first image associated with the first modulated light flux and the second image associated with the second modulated light flux and produce a first viewable image and a second viewable image, respectively, wherein the screen is configured so that light fluxes associated with the first viewable image and the second viewable image are substantially orthogonally polarized.

2. The system of claim 1, wherein the deformations are outward projections from the conductive surface.

3. The system of claim 1, wherein the deformations are inward projections from the conductive surface.

4. The system of claim 1, wherein the wherein the first state of polarization and the second state of polarization are substantially orthogonal.

5. The system of claim 1, wherein the first state of polarization and the second state of polarization are substantially linear.

6. The system of claim 1, wherein the first state of polarization and the second state of polarization are substantially circular.

7. The system of claim 1, wherein the projection screen comprises a metallic sheet, and the projection surface is a surface of the metallic sheet.

8. The system of claim 7, wherein the projection screen includes a substrate to which the metallic sheet is secured.

9. A method, comprising:
    providing at least one metallic sheet;
    beadblasting a surface of the at least one metallic sheet so as to provide a light scattering surface; and positioning the beadblasted surface of the at least one metallic sheet so as to receive polarization encoded first and second image light fluxes, and produce corresponding substantially orthogonally polarized stereoscopically viewable light fluxes.

10. The method of claim 9, further comprising:

providing a plurality of metallic sheets;

joining the plurality of metallic sheets so as to form a substantially continuous surface; and beadblasting the substantially continuous surface.

11. The method of claim 10, where the metallic sheets are substantially planar.

12. The method of claim 10, wherein the metallic sheets are substantially non-planar.

13. The method of claim 10, wherein the metallic sheets are joined by welding.

14. The method of claim 10, wherein the metallic sheets are aluminum.

15. A method of making a projection screen, comprising;

providing a conductive layer on a screen substrate; and forming a plurality of dimples in the conductive layer, wherein the screen substrate includes a plurality of substrate dimples corresponding the dimples in the conductive layer, and further comprising forming the plurality of dimples in the conductive layer by depositing the conductive layer on the screen substrate.

16. The method of claim 15, further comprising forming the substrate dimples by beadblasting.

17. The method of claim 15, further comprising forming the plurality of dimples in the conductive layer with a die that contains a plurality of protrusions corresponding to the plurality of dimples.

18. The method of claim 15, further comprising providing a plurality of screen substrates so as to define the conductive layer.

19. A method of forming a projection screen, comprising;

providing a conductive substrate having a screen surface; and forming a plurality of substantially smooth ovoid projections in the conductive substrate, wherein the projections have ovoid cross sections on the screen surface and a screen template includes a beadblasted surface to which the conductive substrate is conformed.

20. The method of claim 19, wherein forming the plurality of substantially smooth ovoid projections comprises conforming the conductive substrate to the screen template, and supporting the screen substrate with a projection screen substrate.

21. The method of claim 20, wherein the conductive substrate and the projection screen substrate are a common substrate.

* * * * *